C. A. KLINE.
DEVICE FOR PLACING BIFOCULAR SEGMENTS ON LENSES.
APPLICATION FILED APR. 18, 1919.
1,323,190. Patented Nov. 25, 1919.
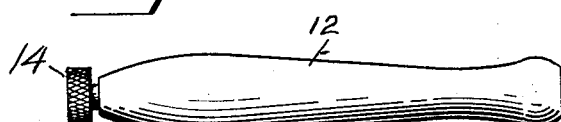
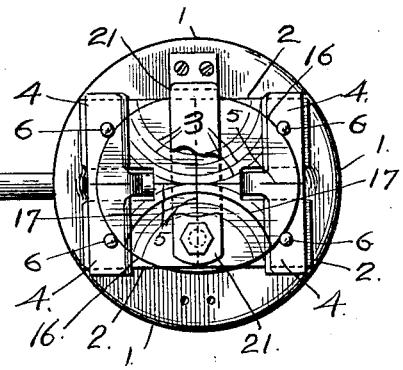
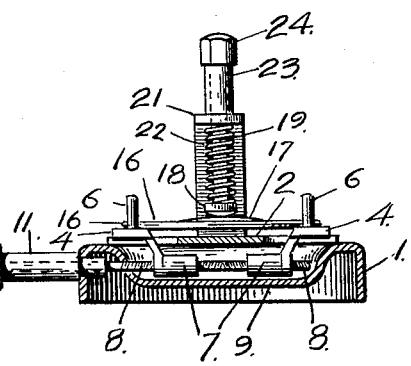
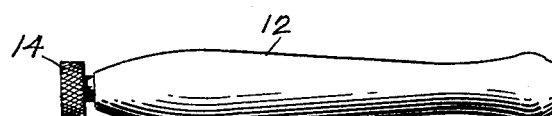
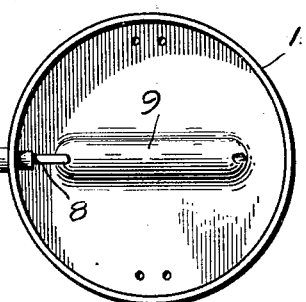
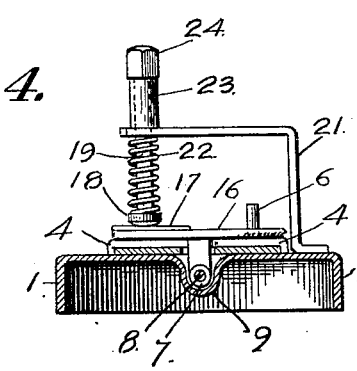
Inventor.
Clarence A. Kline.
By Arthur L. Slee.
Atty.

UNITED STATES PATENT OFFICE.

CLARENCE A. KLINE, OF SAN FRANCISCO, CALIFORNIA.

DEVICE FOR PLACING BIFOCULAR SEGMENTS ON LENSES.

1,323,190. Specification of Letters Patent. Patented Nov. 25, 1919.

Application filed April 18, 1919. Serial No. 291,788.

*To all whom it may concern:*

Be it known that I, CLARENCE A. KLINE, a citizen of the United States, residing in the city and county of San Francisco and State of California, have invented a certain new and useful Improvement in Devices for Placing Bifocular Segments on Lenses, of which the following is a specification.

My invention relates to improvements in a device for placing and retaining bifocular segments on lenses while said segments are being cemented on said lenses wherein yokes operate in conjunction with certain graduations to correctly position the segments relatively to the lenses.

In the present state of the art it is the practice to produce certain bifocular lenses by cementing a bifocular segment on the lens in a certain position by the use of a hard, transparent cement.

In positioning the segment it is necessary for the operator to place the segment manually and it therefore follows that the appearance of the lens, as well as the efficiency thereof, depends entirely upon the skill and firmness of the operator.

It is the primary object of the present invention to provide improved means whereby a lens may be mechanically centered upon graduations indicating the major and minor axes of the lens.

A further object of the invention is the provision of a second set of graduations indicating positions for bifocular segments of various sizes whereby said segments may be correctly positioned relatively to the major and minor axes of the lens.

It is also an object of the improvement to provide improved means for normally holding the segment in its correct position during the application of heat to melt the cement between the segments and lens, and also while cooling to set said cement.

I accomplish these several objects by means of the improved device disclosed in the drawings forming a part of the present specification wherein like characters of reference are used to designate similar parts throughout the said specification and drawings, and in which:

Figure 1 is a broken plan view of my improved device;

Fig. 2 is a longitudinal sectional view thereof;

Fig. 3 is a bottom plan view; and

Fig. 4 is a transverse vertical sectional view disclosing the manner in which the segment is held to the lens.

Referring to the drawings the numeral 1 is used to designate what I term for the purpose of illustration, a heating pan, circular in form and provided with a plate 2 having graduations 5 thereon indicating the minor and major axes of a lens, and likewise provided with two sets of arcuate graduations 3 arranged to indicate the correct position, relatively to the axes graduations 5, of several sizes of bifocular segments.

A pair of yokes, comprising lateral bars 4 each having two vertically disposed pins 6 thereon arranged equidistant from the minor and major graduations 5, are slidably mounted upon the pan 1 by means of nuts 7 having right and left hand threads respectively to engage right and left hand threads on a rod 8 mounted within a depression 9 of the pan 1, and under the plate 2 thereon. The rod 8 passes laterally from the pan 1 and through a tube 11 incased within a suitable handle 12, the other end of said rod 8 being provided with a suitable knurled nut 14 by means of which said rod 8 may be manipulated to actuate the yokes containing the pins 6, the purpose of which will hereinafter be more fully set forth.

A lens 16 is mounted between the pins 6 and upon said lens 16 is placed a bifocular segment 17 normally held in position by means of the rounded head 18 of a vertically disposed plunger 19 slidably mounted within a bracket 21. A sleeve 23 is interposed between the top of the bracket 21 and the head 24 of the plunger 19 while a spring 22 is interposed between the bracket 21 on the opposite side thereof and the rounded head 18 of said plunger 19 to normally hold the segment 17 upon the lens 16.

In operation the lens 16 is placed between the pins 6 on the bars 4 and by turning the nut 14 the right and left hand threads of the rod 8 actuate the nuts 7 and bars 4 with the pins 6 thereon to move said pins to engage the edges of the lens 16 and thereby center the said lens 16 relatively to the heating pan 1 and the major and minor graduations 5 thereon.

The plunger 19 is then raised against the tension of the spring 22 by means of the head 24 and the bifocular segment 17 is positioned, by the aid of the arcuate graduations 3 on the plate 2, relatively to the lens 16, a suitable cement having been first applied to the said lens 16.

As the plunger 19 and head 18 thereof normally retain the segment 17 in position, the pan 1 is held over a flame or other source of heat, not shown, until the cement is melted or fused.

The entire device is then set aside a sufficient period of time to allow for the setting of the cement, after which the lens 16 is removed by turning the nut 14 in the opposite direction to move the pin 6 in opposite directions away from the center of the heating pan 1 and thereby permit the removal of the completed bifocular lens.

Having thus described my invention, what I claim as new and desire to secure by Letters Patent is:

1. A device of the character described comprising a heating pan having graduations thereon to indicate the major and minor axes of a lens, and likewise provided with arcuate graduations to indicate the relative positions of a bifocular portion of a lens; means for centering and holding a lens relatively to the major and minor axes graduations; and means for holding a segment on the lens after the same has been properly placed thereon according to the arcuate graduations.

2. A device of the character described comprising a heating pan having graduations thereon indicating the major and minor axes of a lens, and likewise provided with graduations to indicate relative positions of a bifocal segment to be placed on said lens; a pair of yokes movably mounted upon the pan; means for moving the yokes in opposite directions to engage and center a lens on the graduations; and means for holding a bifocular segment on said lens after the same has been cemented thereon whereby said segment may be retained in proper position while said segment and lens are being subjected to the action of heat applied to the pan to firmly cement said segment in its proper position relatively to the lens.

3. A device of the character described comprising a heating pan having major and minor axes graduated to indicate the relative positions of bifocular segments on a lens; yokes movably mounted upon the pan to engage and center a lens relatively to the axes graduations; means for moving the yokes in opposite directions to engage or disengage the lens; and means for holding a bifocular segment to the lens after the same has been positioned thereon.

4. A device of the character described comprising a heating pan having graduations thereon to indicate the major and minor axes of a lens, and likewise provided with arcuate graduations to indicate the correct positions of a bifocular segment on said lens; a handle extending radially from the pan whereby said pan may be held over a flame; a pair of yokes movably mounted upon the pan and provided with right and left handed threads; a stem extending through the handle and provided with right and left handed threads to engage the nuts on the yokes whereby said yokes may be moved in opposite directions to center a lens on the major and minor graduations; and means for holding a bifocular segment on the lens.

5. A device of the character described comprising a heating pan having graduations thereon to indicate the major and minor axes of a lens, and likewise provided with arcuate graduations to indicate the correct positions of a bifocular segment on said lens; a handle extending radially from the pan whereby said pan may be held over a flame; a pair of yokes movably mounted upon the pan and provided with right and left handed threads; a stem extending through the handle and provided with right and left handed threads, to engage the nuts on the yokes whereby said yokes may be moved in opposite directions to center a lens on the major and minor graduations; a bracket mounted upon the pan; and a spring controlled plunger slidably mounted within the bracket and arranged to engage and hold a bifocular segment upon the lens while the said segment is being cemented thereto.

In witness whereof I hereunto set my signature.

CLARENCE A. KLINE.